INVENTOR.
HAROLD B. SCHULTZ

Aug. 29, 1961  H. B. SCHULTZ  2,998,243
FLUID SUSPENSION LEVELING VALVE
Filed March 2, 1959  3 Sheets-Sheet 2

INVENTOR.
HAROLD B. SCHULTZ
BY
William N. Antonis
ATTORNEY

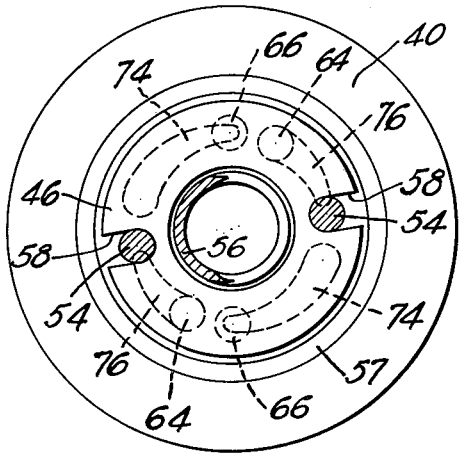
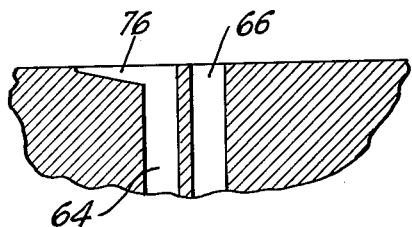
Fig. 6
Fig. 10
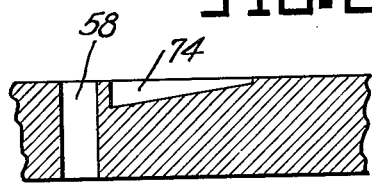
Fig. 11
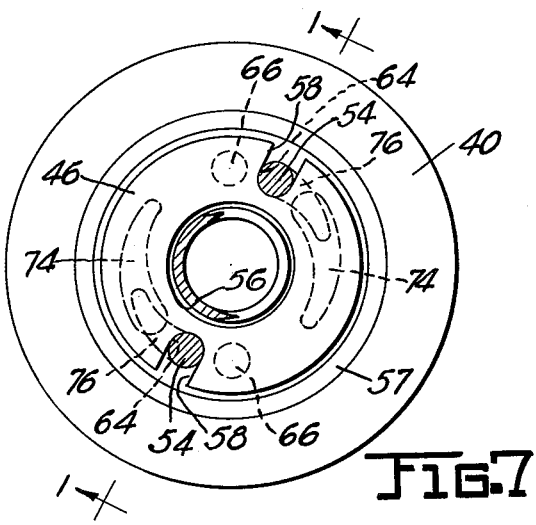
Fig. 7
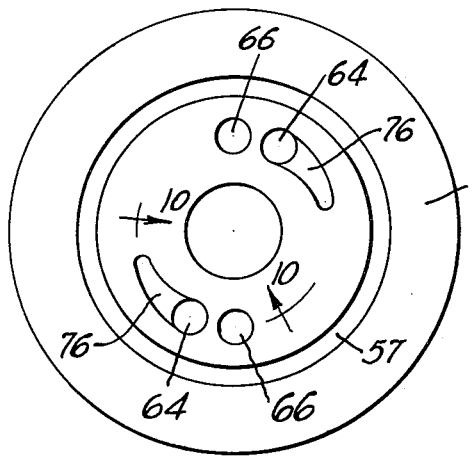
Fig. 8
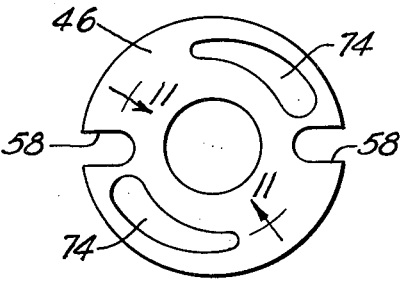
Fig. 9
INVENTOR.
HAROLD B. SCHULTZ
BY William N. Antonie
ATTORNEY United States Patent Office
2,998,243
Patented Aug. 29, 1961

2,998,243
FLUID SUSPENSION LEVELING VALVE
Harold B. Schultz, South Bend, Ind., assignor to The Bendix Corporation, a corporation of Delaware
Filed Mar. 2, 1959, Ser. No. 796,523
5 Claims. (Cl. 267—64)

This invention relates to a fluid suspension system for vehicles and more particularly to a rotary disc type leveling valve for such suspension systems in which two members having contacting faces are mounted for relative rotative sliding movement to various positions of communication and non-communication between ports and grooves formed in each of the faces.

It is an object of this invention to provide a valve of this type which will maintain a vehicle in a predetermined fixed attitude relative to the ground.

Another object of this invention is to provide a valve of this type which has a high degree of sensitivity.

A further object of this invention is to provide a valve of this type in which a positive seal is easily maintained between the two members in face to face contact.

A still further object of this invention is to provide a high degree of metering control over a high range of relative movement between the contacting faces of this type of rotary leveling valve.

Another object of this invention is to provide a rotary leveling valve of this type which is relatively small and simple to fabricate.

A further object of this invention is to provide a small rotary disc type leveling valve having the ports and grooves in the contacting faces arranged to provide large flow areas and balanced hydraulic pressures acting across said faces.

A still further object of this invention is to provide a leveling valve which will permit the elimination of excessive valve actuating forces.

The above and other objects and features of this invention will become apparent from the following description of the device taken in connection with the accompanying drawings which form a part of this specification and in which:

FIGURE 6 is a schematic view, similar to FIGURE 3, of the rotary disc valve, in a metered admission position;

FIGURE 7 is a schematic view, similar to FIGURE 3, of the rotary disc valve in a full admission position;

FIGURE 8 is a plan view showing the arrangement of the grooves and openings in the face of the valve housing;

FIGURE 9 is a plan view showing the arrangement of the grooves and openings in the face of the disc, which is contiguous with the face of the valve housing.

FIGURE 10 is a section taken along line 10—10 of FIGURE 8, which shows the progressive increase in depth of one of the cylinder grooves; and FIGURE 11 is a section taken along line 11—11 of FIGURE 9, which shows the progressive increase in depth of one of the exhaust grooves.

Figure 1:
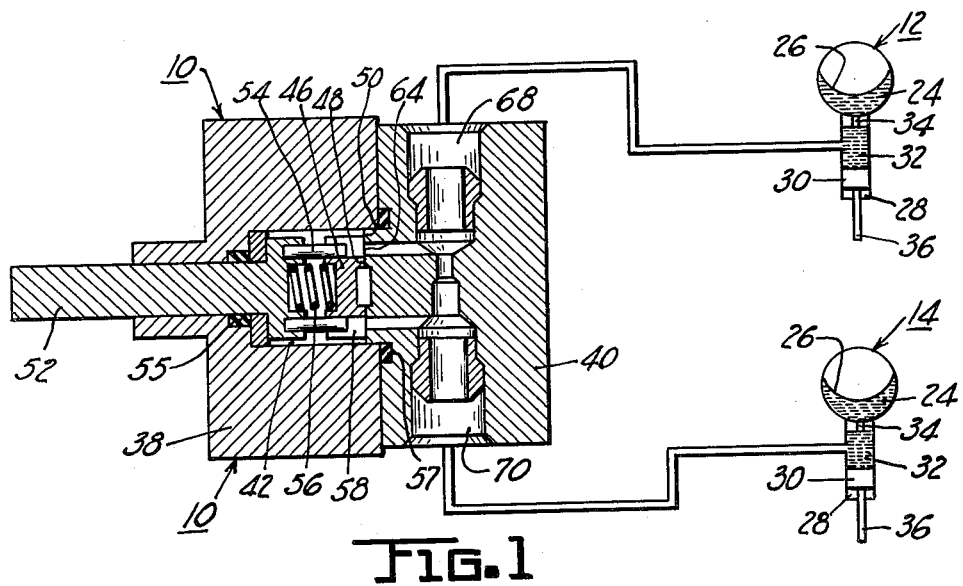
FIGURE 1 is a section taken substantially along line 1—1 of FIGURE 7, showing the rotary disc valve in a fully open or full admission position.
Figure 2:
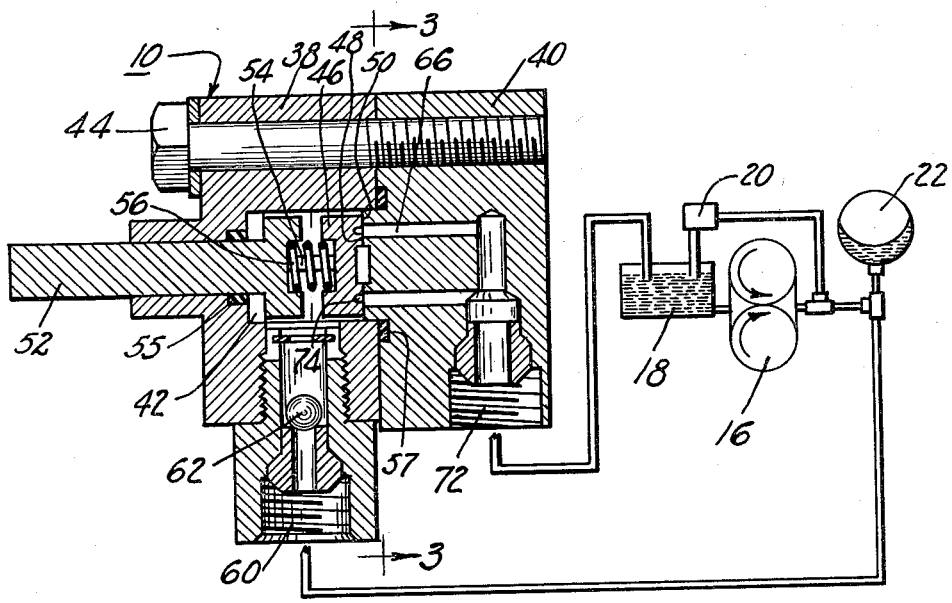
FIGURE 2 is a section taken substantially along line 2—2 of FIGURE 3, showing the rotary disc valve in a neutral position.

Referring to FIGURES 1 and 2, it will be seen that I have shown a rotary disc-type leveling valve 10 for regulating flow to suspension units 12 and 14 in connection with a central hydraulic system which may consist of a pump 16, a reservoir 18, an accumulator charging valve 20, and an accumulator 22. Each suspension unit 12 and 14 includes an accumulator 24 having a bladder 26 for confining a quantity of compressed gas, a hydraulic cylinder 28 having a piston 30 reciprocable therein, a hydraulic chamber 32 formed between the bladder 26 and the piston 30, and a damping valve 34 located in chamber 32. A strut 36 extending from the piston 30 may be connected to wheel attaching members (not shown) while the cylinder 28 may be suitably connected to the frame of the vehicle (not shown). The construction of the suspension unit is such that it will tend to act as a shock absorber.

Leveling valve 10 consists of a two part housing 38 and 40 having a bore 42 therein, said two part housing being held together by a plurality of bolts 44, only one of which is shown. A disc 46 is located in bore 42 and has a valve face 48 formed thereon which is in contact with and slidable on a second valve face 50 formed at the end of said bore on one part of the housing. A control shaft 52 extends into bore 42 and is operatively connected to disc 46 by a pair of pins 54 so that rotation of the control shaft will cause comparable rotation of the disc. A spring 56 is located between the control shaft and disc for urging the disc against the valve face 50 of the housing. A position input signal obtained as a result of relative movement between the vehicle body and the wheels is transmitted to leveling valve 10 through means of a suitable lever and link arrangement (not shown) which causes the control shaft to rotate in one direction or the other. It should be noted that the valve disc 46 is not rigidly connected to the control shaft 52, but is connected to the shaft only by the drive pins 54 which are located in a pair of oppositely disposed pressure ports or slots 58. In this manner the pins not only transmit rotative motion from the shaft to the disc, but also permit relative motion therebetween so that proper face to face contact and positive sealing between the disc and housing may be provided and maintained at all times. Packing rings 55 and 57 are provided for sealing purposes.

Pressure ports 58, formed in the valve face 48, of the disc 46 communicate with the accumulator 22 via housing passage 60 which contains a check valve 62 therein in order to prevent the suspension system from bleeding down. A pair of oppositely disposed working ports 64 and a pair of oppositely disposed return ports 66 are formed in the housing valve face 50, said working ports communicating with the suspension units 12 and 14 via housing passages 68 and 70, respectively, and said return ports communicating with the reservoir 18 via housing passage 72. A pair of oppositely disposed curved grooves 74 are formed in the valve face 48 of disc 46 which upon a given direction of rotation of the disc will communicate the working ports 64 with the return ports 66 and meter flow therebetween. It will be noted that the desired metering is achieved through means of the groove configuration shown in FIGURES 9 and 11 which show that the grooves are relatively narrow and shallow at the end which provides initial communication between the working and return ports and progressively wider and deeper along the groove to the other end which provides for full communication between the ports. A pair of oppositely disposed curved grooves 76 are also formed on the valve face 50 of the housing which upon an opposite direction of rotation of the disc will communicate the pressure ports 58 in the disc with the working ports 64 in the housing and meter flow therebetween. These grooves 76 which extend directly into the working ports 64 are relatively narrow and shallow at the end which provides for initial communication between the pressure and working ports and progressively wider and deeper as the grooves extend directly into the working ports; as shown in FIGURES 8 and 10. By providing pairs of oppositely disposed ports and grooves it is possible to provide large flow areas and balanced hydraulic pressures acting across the valve faces of the disc and housing which tend to prevent the disc 46 from cocking with respect to the housing valve face 50.

Figure 3:
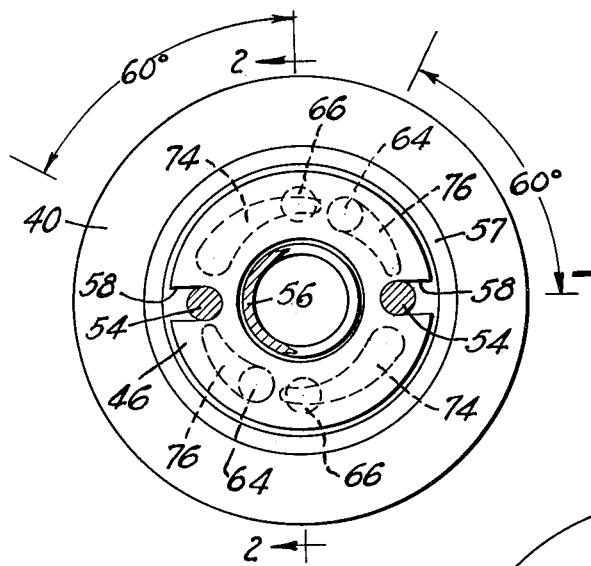
FIGURE 3 is a schematic view of the rotary disc valve in a neutral position taken substantially along line 3—3 of FIGURE 2.
Figure 4:
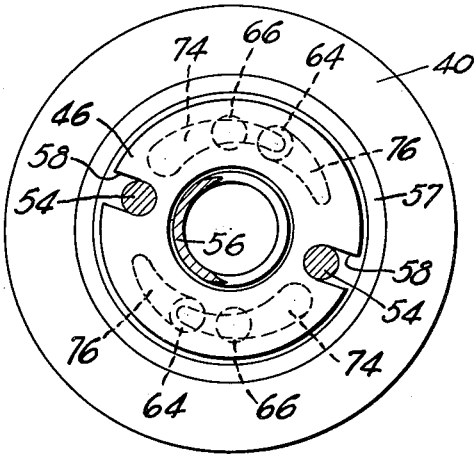
FIGURE 4 is a schematic view, similar to FIGURE 3, of the rotary disc valve in a metered exhaust position.
Figure 5:
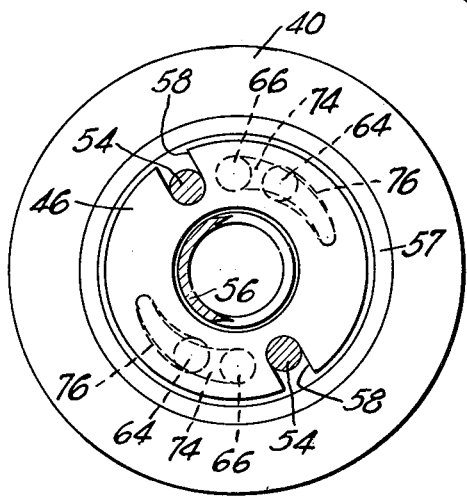
FIGURE 5 is a schematic view, similar to FIGURE 3, of the rotary disc valve in a full exhaust position.

In general the operation of the leveling valve will be as follows:

With the vehicle at rest any load changes which may occur will cause a position signal to be transmitted to the leveling valve 10 via the control shaft 52. This position signal will cause the control shaft to be rotated in one direction or the other depending on whether there is a decrease or an increase in the load so that fluid may be released from or valved into the suspension units as required. Referring to FIGURES 3, 4 and 5 if there is a decrease in load the control shaft 52 will be rotated in a clockwise direction causing comparable clockwise rotation of disc 46. Depending on the magnitude of the position signal caused by the decrease in load, the disc 46 may be moved from the neutral position shown in FIGURE 3 to the metered exhaust position shown in FIGURE 4, wherein disc grooves 74 initially communicate the working ports 64 with the return ports 66 through its relatively narrow shallow end to release fluid from the suspension units, and thence to the full exhaust position shown in FIGURE 5. The arrangement of the ports and grooves is such that approximately a 60° movement of the disc is required from the neutral to the full exhaust position. An increase in load will cause rotation of the control shaft and disc 46 in a counterclockwise direction, as shown in FIGURES 6 and 7. As shown in these views, the disc may move from the neutral position shown in FIGURE 3 to a metered admission position, shown in FIGURE 6, wherein the disc pressure ports 58 initially communicate with the relatively narrow and shallow end of the grooves 74 which extend directly into the working ports 64, as shown in FIGURE 10, and thence to the full admission position shown in FIGURE 7. Approximately a 60° movement of the disc is also required from the neutral to the full admission position.

By providing a valve configuration which will accommodate 60° angular shaft movement in either direction from neutral, it is possible through proper linkage attached to the vehicle axle to allow for full axle movement and avoid use of complicated over travel mechanism. Utilization of a full maximum usable 120° range of movement for actuation permits progressive graduation of flows and greater valve sensitivity.

The several practical advantages which flow from the fluid suspension leveling valve are believed to be obvious from the above, and other advantages may suggest themselves to those who are familiar with the art to which this invention relates.

Having thus described the various features of the invention, what I claim as new and desire to secure by Letters Patent is:

1. In a fluid suspension system having suspension means operatively connected between the sprung and unsprung assemblies of a ground vehicle, a pressure source, and a reservoir, a rotary disc type leveling valve for regulating the flow of fluid to and from said suspension means, said leveling valve comprising a housing having a bore therein and a valve face formed at the end of said bore, a disc having a valve face in contact with and slidable on said housing valve face, a control shaft extending into said bore, means for connecting said control shaft to said disc to transmit rotative forces from said shaft to said disc and for permitting relative movement therebetween so that proper face to face contact between the disc and housing may be maintained, resilient means located between said shaft and said disc for urging said disc against the valve face of said housing, first passage means opening into the housing valve face and communicating with said suspension means, second passage means opening into the housing valve face and communicating with said reservoir, third passage means opening into said bore and communicating with said pressure source, a pressure port extending through said disc and communicating with said third passage, a curved groove formed in the valve face of said disc for communicating said first passage with said second passage and continuously metering flow therebetween from the moment of initial communication to the moment of full communication when said disc is rotated in one direction, said groove being relatively narrow and shallow at the end which provides for initial communication between the first and second passages and progressively wider and deeper from this end to the other end which provides for full communication between said passages, and a curved groove formed in the housing valve face for communicating said third passage means via said pressure port with said first passage means and continuously metering flow therebetween from the moment of initial communication to the moment of full communication when said disc is rotated in the opposite direction, said last mentioned groove being relatively narrow and shallow at the end which provides for initial communication between said first and third passage means and progressively wider and deeper as the groove extends directly into the valve face opening of said first passage means.

2. In a fluid suspension system as defined in claim 1, check valve means located in said third passage means for permitting flow therebetween in only one direction.

3. In a fluid suspension system having suspension means operatively connected between the sprung and unsprung assemblies of a ground vehicle, a pressure source, and a reservoir, a rotary disc type leveling valve for regulating the flow of fluid to and from said suspension means, said leveling valve comprising a pair of relatively movable members having contacting faces, a control shaft, means for connecting said control shaft to one of said members to transmit rotative forces from said shaft to said one member thereby producing shearing rotative motion between said members, said means permitting relative movement between said one member and said shaft so that proper face to face contact between said members may be maintained, resilient means urging one of said members against the other of said members, a pressure port formed in the face of one of said members, a working port and a return port formed in the face of the other of said members, said ports communicating respectively with the pressure source, suspension means and reservoir, a curved groove formed in the face of said one member for communicating said working port with said return port and continuously metering flow therebetween from the moment of initial communication to the moment of full communication as one member is rotated in one direction with respect to said other member, said groove being relatively narrow and shallow at the end which provides for initial communication between the working and return ports and progressively wider and deeper from this end to the other end which provides for full communication between said ports, and a curved groove formed in the face of the other of said members for communicating said pressure port with said working port and continuously metering flow therebetween from the moment of initial communication to the moment of full communication as said one member is rotated in the other direction with respect to said other member, said last mentioned groove being relatively narrow and shallow at the end which provides for initial communication between the pressure and working parts and progressively wider and deeper as the groove extends directly into said working port.

4. A leveling valve for a fluid suspension system as defined in claim 3 wherein one of said members contains two oppositely disposed pressure ports and two oppositely disposed curved grooves and the other of said members contains two oppositely disposed working ports, two oppositely disposed return ports and two oppositely disposed curved grooves.

5. In a fluid suspension system having suspension means operatively connected between the sprung and unsprung assemblies of a ground vehicle, a pressure source, and a reservoir, a rotary disc type leveling valve for regulating the flow of fluid to and from said suspension means, said leveling valve comprising a pair of relatively movable members having contacting faces, means operatively connected to one of said members for producing shearing rotative motion between said members, a pressure port formed in the face of one of said members, a working port and return port formed in the face of the other of said members, said ports communicating respectively with the pressure source, suspension means and reservoir, a curved groove formed in the face of said one member for communicating said working port with said return port and continuously metering flow therebetween from the moment of initial communication to the moment of full communication as one member is rotated in one direction with respect to said other member, said groove being relatively narrow and shallow at the end which provides for initial communication between the working and return ports and progressively wider and deeper from this end to the other end which provides for full communication between said ports, and a curved groove formed in the face of the other of said members for communicating said pressure port with said working port and continuously metering flow therebetween from the moment of initial communication to the moment of full communication as said one member is rotated in the other direction with respect to said other member, said last mentioned groove being relatively narrow and shallow at the end which provides for initial communication between the pressure and working ports and progressively wider and deeper as the groove extends directly into said working port.

References Cited in the file of this patent

UNITED STATES PATENTS

| | | |
|---|---|---|
| 1,519,670 | Danstrup | Dec. 16, 1924 |
| 2,189,094 | Weaver | Feb. 6, 1940 |
| 2,564,444 | Parsons | Aug. 14, 1951 |
| 2,843,396 | Lucien | July 15, 1958 |
| 2,896,965 | Moustakis | July 28, 1959 |